United States Patent [19]

Newson

[11] 3,976,898

[45] Aug. 24, 1976

[54] PRESTRESSED GLASS, AEZOELECTRIC ELECTRICAL POWER SOURCE

[75] Inventor: Melvin M. Newson, Albuquerque, N. Mex.

[73] Assignee: The United States of America as represented by the United States Energy Research and Development Administration, Washington, D.C.

[22] Filed: Mar. 20, 1975

[21] Appl. No.: 560,427

[52] U.S. Cl. ................................. 310/8.3; 310/8.7; 310/9.1; 102/70.2 GA
[51] Int. Cl.² ....................................... H01L 41/04
[58] Field of Search ............... 310/8.1, 8.2, 8.3, 8.5, 310/8.6, 8.7, 9.1, 9.4; 102/70.2 GA

[56] References Cited

UNITED STATES PATENTS

| | | | |
|---|---|---|---|
| 2,827,851 | 3/1958 | Ferrara | 102/70.2 AG |
| 3,819,962 | 6/1974 | Ivey et al. | 310/8.3 |
| 3,863,250 | 1/1975 | McCluskey, Jr. | 310/8.1 X |

*Primary Examiner*—Mark O. Budd
*Attorney, Agent, or Firm*—Dean E. Carlson; Dudley W. King; Richard E. Constant

[57] ABSTRACT

An electrical power source which comprises a body of prestressed glass having a piezoelectric transducer supported on the body in direct mechanical coupling therewith.

6 Claims, 3 Drawing Figures

PRESTRESSED GLASS, AEZOELECTRIC ELECTRICAL POWER SOURCE

BACKGROUND OF INVENTION

There are many applications where a high energy power source would be desirable, even if the energy is produced for only a short period of time, in which the power source is of very small size and simple design. For example, such a power source may be utilized to initiate longer term or other higher energy power sources, such as normally deactivated batteries, which require some initiation energy to begin operation. Other applications include the remote detonation of explosives, the setting off of an alarm or generating a penalty should an unauthorized intrusion occur in a secured area or container, or the like. It would be desirable in these applications that the power source be energizable by some relatively simple mechanism which in itself does not require any appreciable energy to be initiated. In addition, such a power source should be relatively insensitive to environmental conditions to which it may be subjected both before and during operation.

SUMMARY OF INVENTION

In view of the above, it is an object of this invention to provide a novel power source which is of very simple construction and which may be highly compact and of light weight.

It is a further object of this invention to provide a power source which utilizes an energy storage medium which is inherently safe for closely adjoining equipment or personnel and which does not require elaborate or extensive protection to avoid damage to the adjoining equipment or personnel.

It is a further object of this invention to provide a power source which is relatively easy to fabricate, assemble and utilize.

Various other objects and advantages will appear from the following description of the invention, and the most novel features will be particularly pointed out hereinafter in connection with the appended claims. It will be understood that various changes in the details, materials and arrangements of the parts, which are herein described and illustrated in order to explain the nature of the invention, may be made by those skilled in the art within the principles and scope of the invention as expressed in the appended claims.

This invention relates to a power source which utilizes the energy stored in a stressed glass to shock a piezoelectric transducer attached thereto and thus produce an electrical output.

DESCRIPTION OF DRAWING

The present invention is illustrated in the accompanying drawing wherein.

DETAILED DESCRIPTION

Figure 1:
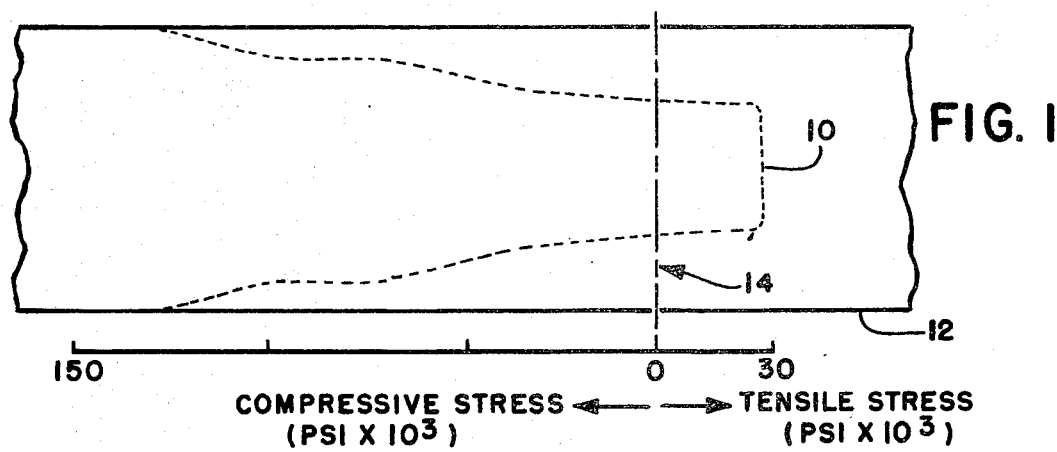
FIG. 1 is a diagram illustrating graphically the stored stresses in a stressed glass body from which energy may be extracted.

Tempered or chemically strengthened, or prestressed ceramic or glass, referred to hereinafter generally as prestressed glass, commonly refers to a group or class of ceramic or glass materials which have been specially treated so as to place the main body of the material under a tensile force balanced by a thin surface layer of material under compressive force covering all surfaces of the main body. The materials are generally formed into the desired products or forms prior to stressing the materials, such as by die forming a glass melt. The formed glass product can then be ground and worked into a desired final form using conventional glass-working techniques. If it is desired, certain glasses can be changed to a crystalline ceramic at this time to obtain higher mechanical strength by know processes. Examples of such materials are those commonly sold under the trademarks "Pyroceram" and "Chemcor" by Corning Glass Works, Corning, N.Y. The ceramic or glass product may then be treated, for example by producing a gradual molecular replacement at a surface, to produce a high internal stress level in the material. The depth of this molecular replacement may be typically from about 6 to 15 mils and may result in the interior of the material being placed in tension at a stress level of from about 10,000 to 40,000 pounds per square inch (psi) and a surface compression stress level of as great as about 130,000 to 150,000 psi. A general description of these materials and the techniques for making the same are described under the heading "Prestressed Glass" at pages 286–288 and at pages 269–271 in "Modern Materials" by Errol B. Shand, Volume 6, 1968, published by Academic Press, Inc., of New York, N.Y. and at pages 817–827 of "Fracture Mechanics of Ceramics" edited by R. C. Bradt and D. P. H. Hasselman, 1974, published by Plenum Publishing Corporation of New York, N.Y. The residual stresses may represent stored elastic energy which may be released by propagation of cracks in the prestressed glass body caused by penetration or damaging of this outer layer, resulting in what is commonly referred to as "dicing." When the outer stressed or compressed layer is partly or completely broken or penetrated by any known means, such as by drilling, melting, etching, grinding, cutting, scratching, bending, etc., hereinafter generally referred to as damaging of the surface, the material in tension "explosively" disintegrates releasing the stored stressed energy. It has been found that the minimum tensile stress that is needed to provide this disintegration is about 8,000 psi. The resulting fractures may propagate throughout the material at a velocity of around 5,000 to 6,000 feet per second and may produce as much as about 11 to 14 inch-pounds of strain energy.

The characteristics of either the ceramic or glass materials, that is prestressed glass, such as disintegration force, size of resulting pieces, and mechanical strength, may be varied by changing the composition of materials or the processes for forming them in a manner well known in the art.

These stress characteristics are illustrated in FIG. 1 by the stress curve 10 in a prestressed glass body 12, as a typical case. It has been found that when the compressive stress layer is penetrated, such as to the indicated thickness at location 14, the penetration may then proceed to complete breaking up or dicing of the prestressed glass body 12 throughout its volume. It has been found that energies in excess of 10,000 ergs may be produced from a prestressed glass body utilizing a ferroelectric piezoelectric ceramic disc one inch in diameter and 0.06 inch thick supported on the stressed glass body.

Figure 2:
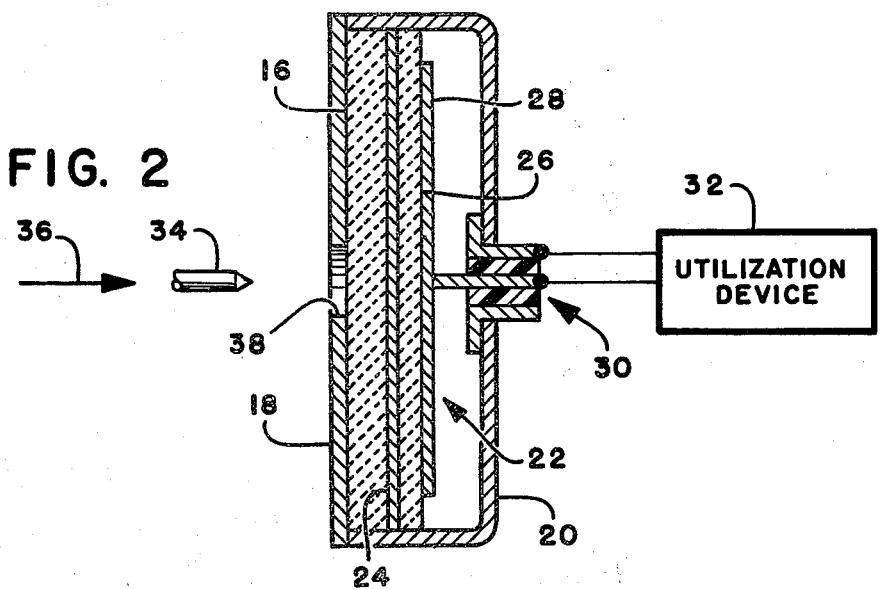
FIG. 2 is a cross-sectional and somewhat diagrammatic view of a power source incorporating the features of this invention.

In the embodiment of this invention shown in FIG. 2 with greatly exaggerated thicknesses, a body of prestressed glass 16 is supported on a wall 18 within housing 20. A piezoelectric transducer 22 may be positioned within housing 20 essentially directly against a surface of prestressed glass body 16, in the manner shown, with a suitable fired on silver or the like thin electrode 24 sandwiched between a piezoelectric element or plate 26 and body 16. The piezoelectric element 26 and prestressed glass body 16 should generally be positioned so as to have major surfaces in substantially coextensive and adjoining positions to enhance the mechanical coupling of the stored energy in the stressed glass body into the piezoelectric and to enhance the extraction of the electrical energy from the piezoelectric element. In addition, the piezoelectric transducer 22 should be held in good and essentially direct mechanical coupling against body 16, such as by mechanical clamping devices (not shown) or by suitable high density adhesives, such as a stiff epoxy of from about 0.1 to about 1 mil thick, which provide a stiff bond with as close to direct mechanical coupling as possible. If it is desired, the adhesive layer between electrode 24 and body 16 may be formed from a conductive material, such as a silver epoxy, to provide a dual function. The electrical energy from piezoelectric element 26 may be extracted from element 26 via electrode 24 and its connection about its periphery to housing 20 and a similar second electtode 28 disposed on an opposing surface of element 26. This electrical energy may be coupled through a suitable connector and transmission lines 30 to an appropriate utilization device 32.

The power source, that is the combination of prestressed glass body 16 and piezoelectric transducer 22, may be activated by scoring or otherwise penetrating the outer layer of prestressed glass body 16 into its tensile stressed inner body by any suitable means, such as by accelerating a scribe or other pointed probe 34 into prestressed body 16, as indicated by the arrow 36, through a suitable opening 38 in wall 18. When the probe 34 penetrates the outer layer of prestressed glass body 16, the prestressed glass body will shatter and dice releasing the stored energy therein and producing a shock or shock wave which is then transmitted through electrode 24 into the piezoelectric element 26. The piezoelectric element 26 will then produce an electrical pulse of length, amplitude and duration, commensurate with the energy stored in prestressed body 16, the type of piezoelectric material utilized in element 26 and its size, through electrode 24 and 28 and coupling 30 to the utilization device 32.

The utilization device 32 may be any suitable apparatus which is capable of using the electrical pulse produced by the power source and may include such as a detonator for an explosive device, an alarm or any other appropriate triggered electrical mechanism. The probe 34 may be any stabber, firing pin, or other object or mechanism which is capable of penetrating the outer layer of the prestressed glass body 16.

The piezoelectric element 26 may be any suitable material which exhibits the well known piezoelectric effect, that is the material when shocked will produce an electrical signal commensurate with the amplitude and velocity of the shock wave. Such piezoelectric materials may include single crystal quartz or lithium niobate having an appropriate crystal orientation with respect to the stressed glass body 16 or a ferroelectric ceramic which has an appropriate polarization direction. Suitable ferroelectric ceramics may include any of the lead zirconate titanate ferroelectric ceramics, or the like. These ferroelectric ceramics are characterized by very high piezoelectric coefficients and by the ability to be formed into any desired shape and configuration which may be suitable for a particular application.

The respective prestressed glass body 16 and ferroelectric transducer 22 may be provided with any appropriate configuration or shape depending upon the desired application and location of the power source. As the piezoelectric element 26 is only capable of receiving shock or pressure wave energy produced within the stressed glass body which is contiguous and coextensive therewith, for minimum size, it may be desirable to provide the prestressed glass body and piezoelectric transducer with coextensive marginal portions, as shown in FIG. 2. However, there may be applications where it would be desirable to provide a plurality of piezoelectric transducers 22 distributed at different portions or locations on one or more surfaces of a larger stressed glass body so as to provide more than one power source signal from a single stressed glass body or to insure production of a signal upon penetration of the stressed glass body should there be some danger that the dicing of the stressed glass may not proceed throughout the body.

Figure 3:
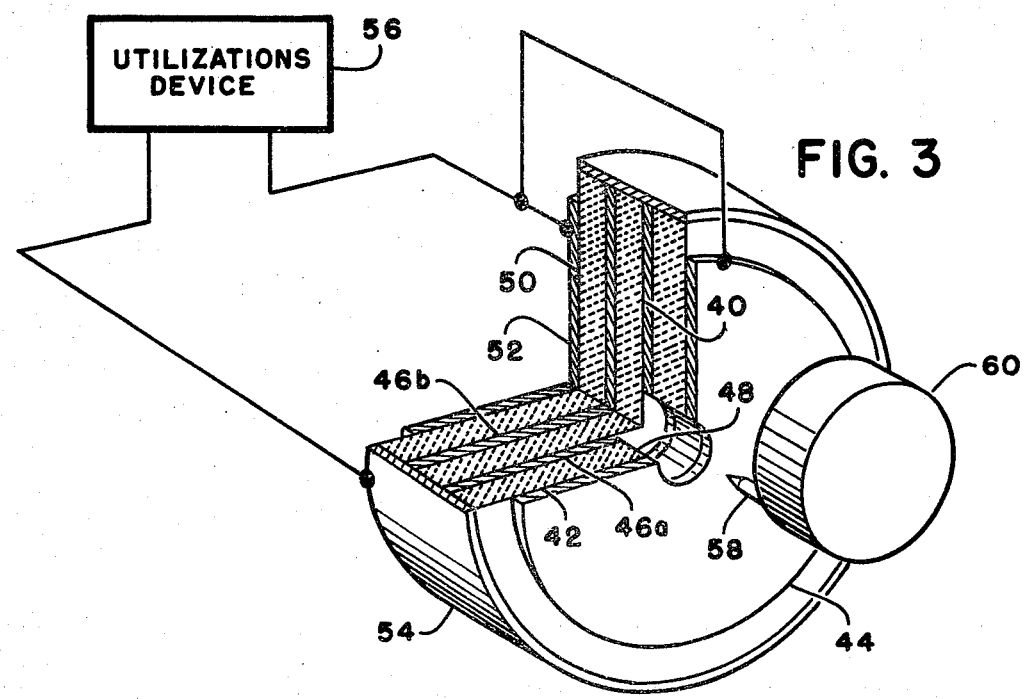
FIG. 3 is a perspective and partially cutaway view of another arrangement of a power source utilizing a stressed glass body and piezoelectric transducers.

A particularly effective utilization of the stored energy within a stressed glass body may be achieved using the embodiment shown in FIG. 3. In this embodiment, a prestressed glass body or disc 40 is sandwiched between a pair of piezoelectric transducers having substantially coextensive and circular marginal portions with the body 40. One transducer includes an annular piezoelectric element 42 sandwiched between annular electrodes 44 and 46a, all forming a central passageway 48 communicating from the exterior of the transducer to a surface of stressed glass body 40. The other piezoelectric transducer includes a piezoelectric element or disc 50 sandwiched between an electrode 46b and 52, electrodes 46a and 46b being interconnected by an annular or ring electrode 54. The jointly connected electrodes 46a, 46b and 54 and the jointly coupled electrodes 44 and 52 are appropriately connected to a suitable utilization device 56. It will be apparent, that the piezoelectric elements 42 and 50 should be oriented in a manner which will produce the proper polarity of electrical signals at their respective electrode pairs to provide either a series or parallel coupling of electrical energy to utilization device 56, as is desired for the particular application. The power source may be initiated by a suitable stabber 58 which is driven through passageway 48 against the surface of stressed glass body 40 exposed therein. The stabber 58 may be driven by a suitable mechanism 60 which may be provided with a timer or other delay should such be deemed desirable.

Utilizing piezoelectric elements formed from lead zirconate titanate ferroelectric discs having a thickness of about 0.07 inch and an outer diameter of about 2.25 inches and with a prestressed glass body of about 0.125 inch thick and the same diameter in the arrangement shown in FIG. 3, a one microfarad capacitor was charged to a voltage of 1,800 volts in amplitude to a total energy of about 78 milli-joules when the body was shattered. A similar power source was initiated and discharged into a 0.047 microfarad capacitor connected in parallel to a series connected spark gap (selected for a 1,200 volt breakdown at 200 volts/microsecond) and a bridgewire. The bridgewire burst at 435 amps, 0.92 microsecond from the start of waveform rise. A power source similar to that shown in FIG. 2 using a lead zirconate titanate ferroelectric disc and prestressed glass body of similar size charged the same size capacitor to about 1,400 volts and a total energy of about 46 milli-joules. The piezoelectric transducers utilized included fired on silver electrodes of from about 0.5 to about 1 mil in thickness, preferably 1 mil or less, with an epoxy adhesive layer of about 1 mil in thickness.

What is claimed is:

1. A power source comprising the combination of a body of prestressed glass which explosively disintegrates upon damaging of a surface thereof; a piezoelectric transducer supported directly on a face of said body consisting essentially of a piezoelectric element for substantially instantaneous shock activation thereof throughout interfaces of said element and prestressed glass body, and a pair of thin electrodes disposed on opposite surfaces of said element; and means for coupling electrical energy from said electrodes to an actuable device.

2. The power source of claim 1 wherein one of said electrodes is sandwiched between said piezoelectric element and said body and is of thickness of from about 0.5 to about 1 mil.

3. The power source of claim 2 including a plurality of said piezoelectric transducers supported directly on said body.

4. The power source of claim 3 including at least one of said piezoelectric transducers supported on opposite sides of said body.

5. The power source of claim 4 wherein said piezoelectric transducers and said body are circular and have substantially coextensive marginal portions.

6. The power source of claim 5 including a plunger adjacent a surface of said body and means is provided for driving the plunger against and into said body.

* * * * *